United States Patent
Usuba et al.

(10) Patent No.: US 8,774,388 B2
(45) Date of Patent: Jul. 8, 2014

(54) TELEPHONE TERMINAL, TELEPHONE COMMUNICATION SYSTEM, AND TELEPHONE TERMINAL CONFIGURATION PROGRAM

(75) Inventors: Shinji Usuba, Tokyo (JP); Tatsuya Satoh, Saitama (JP); Kouki Yamaguchi, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1284 days.

(21) Appl. No.: 11/896,272

(22) Filed: Aug. 30, 2007

(65) Prior Publication Data

US 2008/0080694 A1     Apr. 3, 2008

(30) Foreign Application Priority Data

Sep. 28, 2006   (JP) ................. 2006-265197

(51) Int. Cl.
*H04M 7/00*     (2006.01)
(52) U.S. Cl.
USPC ........................................ 379/219
(58) Field of Classification Search
CPC ................... H04M 7/00; H04L 12/66
USPC ......... 370/466, 335, 356, 338, 352, 486, 232;
709/228; 710/1; 717/171; 375/240.24;
482/1; 707/100
See application file for complete search history.

(56) References Cited

U.S. PATENT DOCUMENTS

| | | | | |
|---|---|---|---|---|
| 5,974,471 A * | 10/1999 | Belt | ................... | 710/1 |
| 6,314,565 B1 * | 11/2001 | Kenner et al. | ................. | 717/171 |
| 6,856,612 B1 * | 2/2005 | Bjelland et al. | ............... | 370/338 |
| 7,002,992 B1 | 2/2006 | Shaffer et al. | | |
| 7,171,479 B2 * | 1/2007 | Buchanan et al. | ............ | 709/228 |
| 7,307,980 B1 * | 12/2007 | Shah | .............................. | 370/352 |
| 7,353,274 B1 * | 4/2008 | Rouhi et al. | ................... | 709/225 |
| 7,460,477 B2 * | 12/2008 | Yata et al. | ...................... | 370/232 |
| 7,733,850 B1 * | 6/2010 | Croak et al. | ................... | 370/352 |
| 7,916,755 B2 * | 3/2011 | Hasek et al. | ................... | 370/486 |
| 2003/0221014 A1 * | 11/2003 | Kosiba et al. | ................. | 709/231 |
| 2004/0228327 A1 | 11/2004 | Punjabi et al. | | |
| 2004/0233994 A1 * | 11/2004 | Pearson | ................... | 375/240.24 |
| 2004/0258016 A1 | 12/2004 | Schmidt et al. | | |
| 2005/0008030 A1 * | 1/2005 | Hoffmann et al. | ............ | 370/466 |
| 2005/0091392 A1 * | 4/2005 | Gesswein et al. | ............. | 709/231 |
| 2005/0201336 A1 * | 9/2005 | Lee | ................................ | 370/335 |
| 2005/0234731 A1 * | 10/2005 | Sirivara et al. | ................ | 704/500 |

(Continued)

FOREIGN PATENT DOCUMENTS

| | | | |
|---|---|---|---|
| JP | 1-105627 A | 4/1989 | |
| JP | 2000-181717 A | 6/2000 | |

(Continued)

*Primary Examiner* — Asad Nawaz
*Assistant Examiner* — Parth Patel
(74) *Attorney, Agent, or Firm* — Rabin & Berdo, P.C.

(57) ABSTRACT

A telephone terminal executes voice communication with a partner telephone terminal by using a selected codec program to code and decode voice signals. Both telephone terminals have facilities for storing codec programs and transferring codec programs over a communication network. During a voice call, one of the two telephone terminals may transfer a codec program to the other telephone terminal, and the call may then proceed by use of the transferred codec program. This enables voice communication to take place with the best codec program that either telephone terminal can provide, even if the two telephone terminals are associated with different communication systems.

17 Claims, 6 Drawing Sheets

(56) References Cited

U.S. PATENT DOCUMENTS

| | | | |
|---|---|---|---|
| 2006/0034266 A1* | 2/2006 | Harris et al. | 370/356 |
| 2006/0239236 A1* | 10/2006 | Otsuka | 370/338 |
| 2006/0240947 A1* | 10/2006 | Qu | 482/1 |
| 2007/0016703 A1* | 1/2007 | Bozionek et al. | 710/68 |
| 2007/0141993 A1* | 6/2007 | Franz et al. | 455/67.7 |
| 2007/0260615 A1* | 11/2007 | Shen | 707/100 |
| 2007/0291776 A1* | 12/2007 | Kenrick et al. | 370/401 |

FOREIGN PATENT DOCUMENTS

| | | | | | |
|---|---|---|---|---|---|
| JP | 2000-507404 A | | 6/2000 | | |
| JP | 2000181717 A | * | 6/2000 | | G06F 9/44 |
| JP | 2001-337935 A | | 12/2001 | | |
| JP | 2002-091496 | | 3/2002 | | |
| JP | 2002091496 A | * | 3/2002 | | G10L 19/00 |
| JP | 2003-513571 | | 4/2003 | | |
| JP | 3463742 B2 | * | 11/2003 | | H04L 12/66 |
| JP | 2005-72957 A | | 3/2005 | | |
| JP | 2005-260649 A | | 9/2005 | | |
| KR | 2005096622 A | * | 10/2005 | | |
| KR | 2005096623 A | | 10/2005 | | |
| KR | 2005096623 A | * | 10/2005 | | |
| KR | 2005096625 A | * | 10/2005 | | |
| KR | 2005096629 A | * | 10/2005 | | |
| WO | WO 97/29606 A1 | | 8/1997 | | |
| WO | WO 01/33879 A1 | | 5/2001 | | |
| WO | WO-03/032615 A1 | | 4/2003 | | |

* cited by examiner

TELEPHONE TERMINAL, TELEPHONE COMMUNICATION SYSTEM, AND TELEPHONE TERMINAL CONFIGURATION PROGRAM

BACKGROUND OF THE INVENTION

1. Field of the Invention

The present invention relates to a telephone terminal, a telephone communication system, and a telephone terminal configuration program, which can be installed in an information processing device to enable the information processing device to operate as a telephone terminal.

2. Description of the Related Art

Japanese Patent Application Publication (JP) No. 2002-91496 describes a voice transmitting device in which programs for different codecs complying with different standards are stored in the device and the necessary program is downloaded into a digital signal processor in the device. In a device of this type, the available coding systems are limited to the coding systems implemented by the codec programs stored in the device.

JP 2003-513571 describes a more flexible communication system in which a codebook is downloaded from a system file server into mobile communication terminals or stations, which use the codebook for coding and decoding messages. The codebook is downloadable only within the communication system, however, so it is not possible to match the coding system of a communication terminal operating in a different system. Inter-system communication capabilities are limited accordingly.

With the increasing variety of terminals available for telephone communication, these limitations become increasingly serious. For example, personal computers can now be used as telephone terminals by installing software to make them operate as what are called Internet protocol (IP) softphones. Many types of IP softphone software are available, but with the systems described above, when IP softphone users in different systems communicate with each other, their choice of coding methods is confined to a limited selection of coding methods supported in both systems.

SUMMARY OF THE INVENTION

An object of the present invention is to expand the range of coding and decoding methods that can be used for communication between telephone terminals.

Another object of the invention is to enable telephone terminal users to obtain better quality of service.

The invention provides a telephone terminal having a memory storing at least one type of codec program. A codec selection processor in the telephone terminal negotiates with a partner telephone terminal to select a codec program to use during voice communication. A transmitting processor can transfer the selected codec program from the memory to the partner telephone terminal over a communication network. A receiving processor operative can receive the selected codec program from the partner telephone terminal through the communication network and store the received codec program in the memory. Once the selected codec program is stored at both telephone terminals, a voice processor in the telephone terminal executes the selected codec program to code and decode voice signals during voice communication.

The invention also provides a telephone communication system comprising a plurality of the telephone terminals as described above, in which codec programs are transferred between the telephone terminals.

The invention further provides a machine-readable medium storing a telephone terminal configuration program executable by a computer to make the computer operate as a telephone terminal of the type described above.

By enabling telephone terminals to exchange codec programs on a peer-to-peer basis, the present invention greatly expands the range of coding systems available for use in communication between telephone terminals in different communication systems.

DETAILED DESCRIPTION OF THE INVENTION

Figure 1:
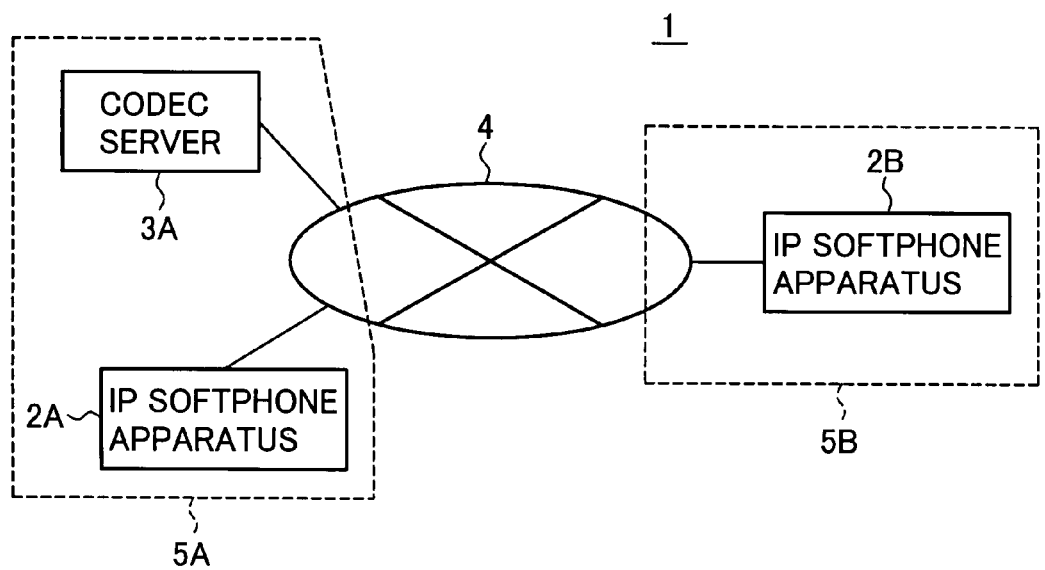
FIG. 1 is a block diagram showing the general structure of an integrated IP telephone system embodying the invention.

An embodiment of the invention will now be described with reference to the attached drawings, in which like elements are indicated by like reference characters.

Referring to FIG. 1, the embodiment includes an integrated IP telephone communication system 1 in which a plurality of telephone terminals 2A, 2B and a codec server 3A are interconnected through an IP network 4. The two telephone terminals 2A, 2B shown are information processing devices such as personal computers in which a telephone terminal configuration program is installed, enabling them operate as IP softphones. These telephone terminals 2A, 2B will accordingly be referred to as IP softphone apparatuses. The integrated IP telephone communication system 1 may include other telephone terminals as well.

The codec server 3A is, for example, a call control server operated by the provider of an IP telephone system 5A that forms one part of the integrated IP telephone communication system 1. IP softphone apparatus 2A is operated by a user (subscriber) who subscribes to the IP telephone service and possibly other communication services provided by the provider of IP telephone system 5A. IP softphone apparatus 2B is operated by a subscriber in a different IP telephone system 5B. Although not shown in the drawing, the other IP telephone system 5B may also have a codec server, for which the reference characters 3B will be used below.

Figure 2:
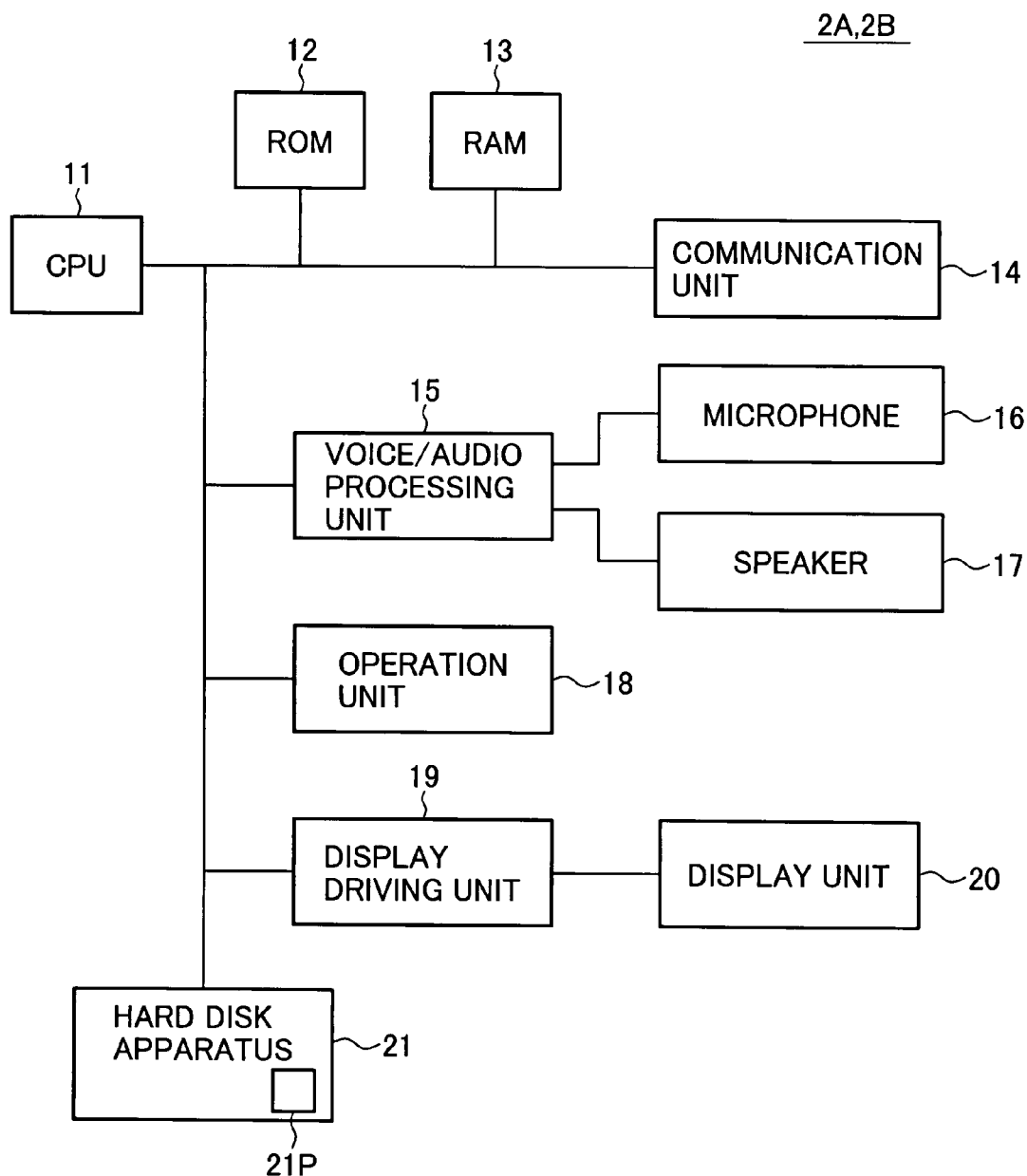
FIG. 2 is a block diagram showing the structure of an IP softphone apparatus embodying the invention.

Referring to FIG. 2, the device constituting each of the IP softphone apparatuses 2A, 2B comprises a central processing unit (CPU) 11, read-only memory (ROM) 12, random-access memory (RAM) 13, a communication unit 14, a voice/audio processing unit 15, a microphone 16, a speaker 17, an operation unit 18 such as a keyboard and/or pointing device, a display driving circuit 19, a display unit 20, and a hard disk drive 21.

The CPU 11 executes programs stored in the ROM 12, the RAM 13, or the hard disk drive 21, using the RAM 13 or the hard disk drive 21 as working memory. In this embodiment, a softphone program 21P (the telephone terminal configuration program) is installed in the hard disk drive 21. In response to an operation performed by the user, the softphone program 21P is loaded, either in its entirety or in sections, into a part of the RAM 13 that functions as a main memory, and is executed by the CPU 11, causing the device to operate as an IP softphone.

The communication unit 14 performs communication under control of the CPU 11 or an application program executed by the CPU 11. The communication unit 14 can perform a variety of types of communication, depending on the application program. When the information processing device operates as an IP softphone, the communication unit 14 performs functions such as control communication to set up and manage a voice call, voice communication during the call, and data communication to transfer a codec program file to or from the information processing device.

The voice/audio processing unit 15, under control of the CPU 11 or a program executed by the CPU 11, converts digital audio signals such as voice signals, music signals, and so on to analog signals for output as sound from the speaker 17, and converts analog audio signals such as voice signals picked up by the microphone 16 to digital signals. The microphone 16 and the speaker 17 may reside in separate devices, or they may be combined into a single device such as a headset.

In this embodiment, digital voice signals are coded and decoded by the CPU 11, by executing a codec program. The voice/audio processing unit 15 is not involved in the coding and decoding of voice signals.

The operation unit 18 receives information input by the user and transfers the input information to the CPU 11. The display driving circuit 19 drives the display unit 20 to display images under control of the CPU 11, or a system program or application program executed by the CPU 11.

The hard disk apparatus 21 stores various programs and data files including, as noted above, the softphone program 21P.

Figure 3:
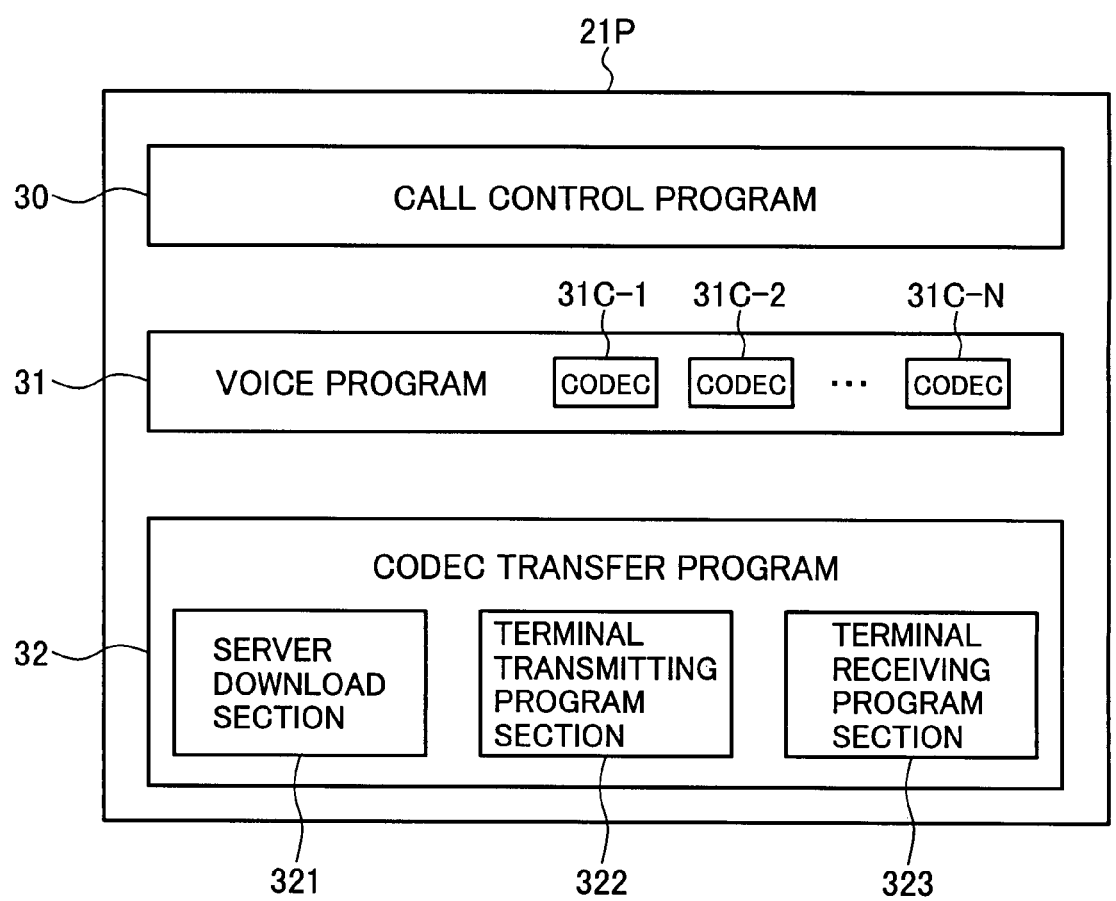
FIG. 3 is a diagram illustrating the structure of a softphone program according to the invention.

Referring to FIG. 3, the softphone program 21P includes a call control program 30, a voice program 31, and a codec transfer program 32.

The call control program 30, which the CPU 11 executes to manage voice communication sessions by setting up, connecting, and disconnecting voice calls, includes program code for assembling and disassembling call control IP packets and program code for conducting negotiations with the call control program in a partner IP software apparatus to determine which codec to use during a call. Communication for call control is carried out according to, for example, a standard session initiation protocol (SIP).

The voice program 31, which the CPU 11 executes to code and decode digital voice signals and assemble and disassemble voice IP packets during a voice communication session, includes at least one codec program and normally includes a plurality of codec programs 31C-1 to 31C-N, where N is an integer greater than one. Each codec program conforms to, for example, the dynamic link library (DLL) format. Although shown as separate programs in FIG. 3, the codec programs 31C-1 to 31C-N may share certain common parts, in which case, when a codec program is transferred, it may only be necessary to transfer part of the program. The codec programs 31C-1 to 31C-N are prioritized. When a plurality of codec programs are usable, the voice program 31 normally uses the codec program with the highest priority.

The codec transfer program 32 includes a server download section 321 for downloading codec programs from the codec server 3A (or 3B), a terminal transmitting program section 322 for transferring one of the codec programs stored in the IP softphone apparatus to the partner IP softphone apparatus during voice communication, and a terminal receiving program section 323 for receiving a codec program transmitted from the partner IP softphone apparatus and passing it to the voice program 31. Codec programs are transferred according to a standard protocol such as a file transfer protocol (FTP), hypertext transfer protocol (HTTP), or real-time transport control (RTCP) using application packets (APPs).

Figure 4:
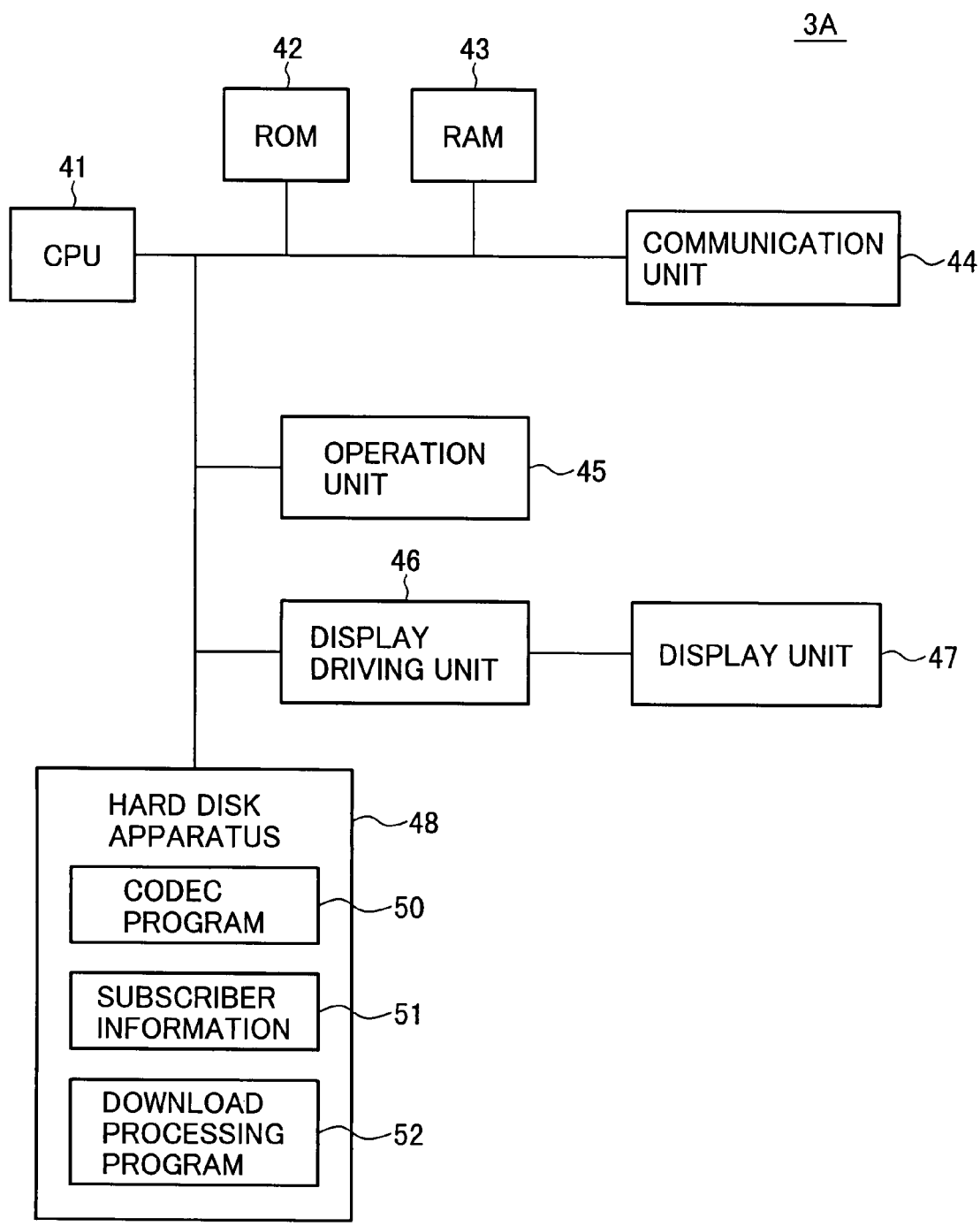
FIG. 4 is a block diagram illustrating the structure of the codec server in FIG. 1.

Referring to FIG. 4, the codec server 3A is also an information processing device, and comprises a CPU 41, a ROM 42, a RAM 43, a communication unit 44, an operation unit 45, a display driving unit 46, a display unit 47, and a hard disk apparatus 48. The CPU 41, ROM 42, RAM 43, communication unit 44, operation unit 45, display driving unit 46, display unit 47, and hard disk apparatus 48 are well known devices basically similar to those in the IP softphone apparatus, so descriptions will be omitted.

The hard disk apparatus 48 stores an assortment of codec programs 50 recognized as usable in the IP telephone system 5A to which the codec server 3A belongs, subscriber information 51 relating to the subscribers to IP telephone system 5A, and a download processing program 52 for downloading codec programs.

Some of the codec programs 50 stored in the codec server 3A may not be executable by the voice program 31 in a particular IP softphone apparatus, because of interface differences, for example. In that case, the codec server 3A may attach what is termed a wrapper to the codec program to make the codec program compatible with the IP softphone's voice program 31, and transfer the codec program together with its wrapper. The codec server 3A may store a selection of wrappers suitable for different types of softphones.

Each of the codec programs stored in the codec server 3A includes identifying information, information designating the environment in which the codec program can be executed, and conditions on users (subscribers) allowed to download the codec program. One of these conditions may be, for example, the bandwidth for which the user has subscribed.

The subscriber information 51 includes each subscriber's address, name, telephone number, authentication information, and contract details. The contract details stipulate, among other things, whether or not the subscriber is allowed to download codec programs, what conditions are imposed on the downloaded codec programs, and whether or not the subscriber is permitted to transfer a downloaded codec program to another IP softphone apparatus.

The codec server 3B (not shown) in IP telephone system 5B has a similar structure.

Although the IP softphone apparatuses 2A and 2B belong to different IP telephone systems 5A and 5B, they both have the same softphone program 21P, obtained from a commercial software supplier, for example. This does not necessarily mean that the softphone programs 21P in the two IP softphone apparatuses 2A and 2B are identical, however. Depending on system rules and other factors, the softphone programs 21P in the two IP softphone apparatuses 2A and 2B may include different assortments of codec programs.

Next, the operation of the integrated IP telephone system according to the embodiment will be described, in particular the operations relating to the transfer of codec programs.

Figure 5:
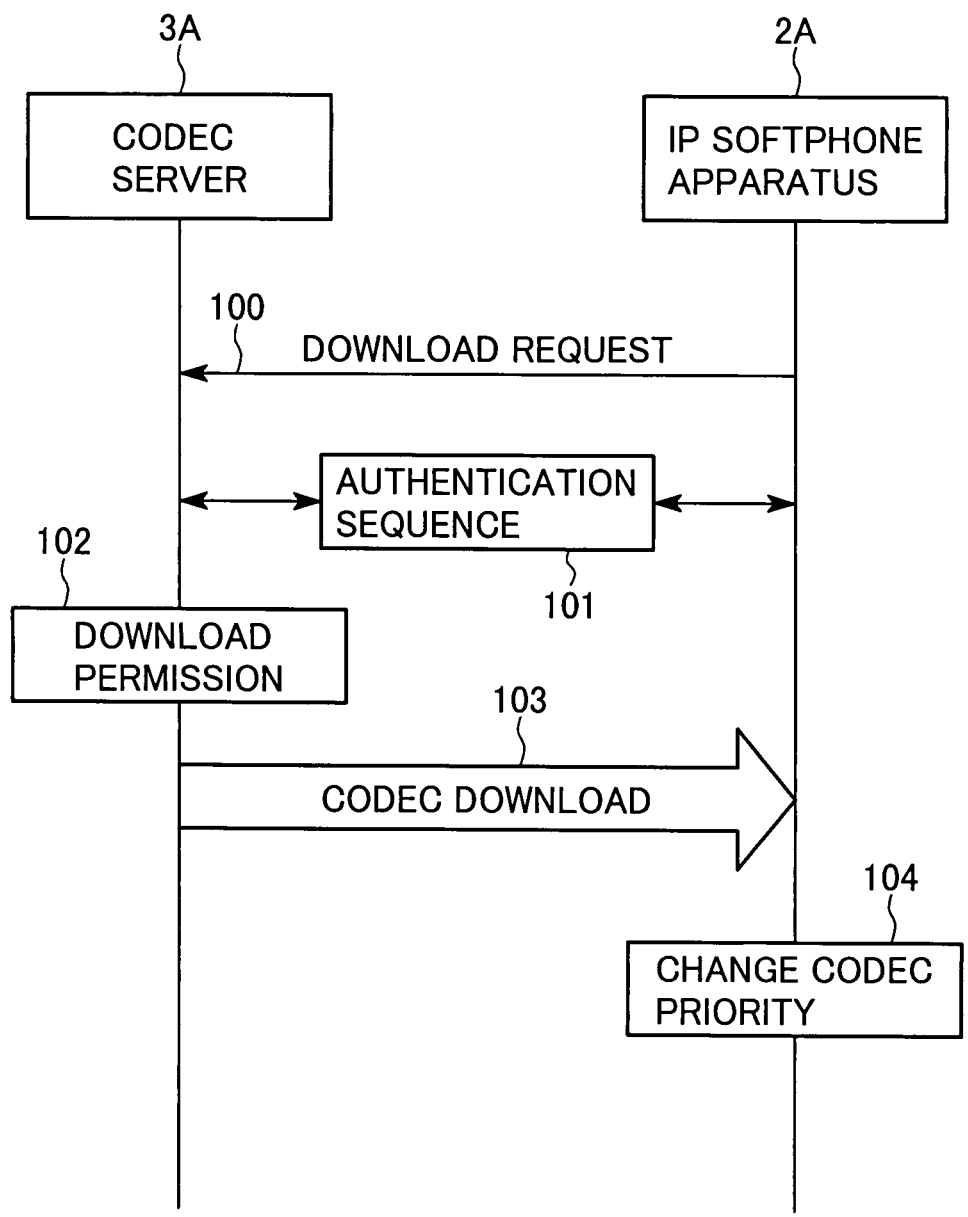
FIG. 5 illustrates a communication sequence for downloading a codec program from the codec server to the IP softphone apparatus in FIG. 2.

First, the operation of downloading a codec program from the codec server 3A to IP softphone apparatus 2A will be described with reference to the sequence diagram in FIG. 5. This program transfer is executed by, for example, FTP or HTTP.

The user of IP softphone apparatus 2A initiates this process by entering commands from the operation unit 18 to start the softphone program 21P and enable the server download section 321 in the codec transfer program 32. The CPU 11, using the display on the display unit 20, requests input of information identifying the desired codec program. The user enters this information via the operation unit 18, and the CPU 11 sends a download request to the codec server 3A (step 100).

Prior to the download request, the IP softphone apparatus 2A may request a list of codec programs from the codec server 3A, and the codec server 3A may send the IP softphone apparatus 2A a list of information identifying all available types of codec programs and summarizing their coding methods (listing, for example, their speed, bandwidth, and compression method). The CPU 11 in the IP softphone apparatus 2A displays this information on the display unit 20, the user selects the desired codec program from the list, and the IP softphone apparatus 2A then sends the download request to the codec server 3A.

When the codec server 3A receives the download request, the IP softphone apparatus 2A and codec server 3A proceed to execute an authentication sequence (step 101). In an exemplary authentication sequence, the codec server 3A requests a password from the IP softphone apparatus 2A, the IP softphone apparatus 2A prompts the user to enter the password and sends it back to the codec server 3A, and the codec server 3A compares the password with a stored password. If this password check passes, the codec server 3A proceeds to check whether the requested codec program is permitted by contract to be provided to the requesting subscriber, and whether the IP softphone apparatus 2A has the capabilities (e.g., CPU processing power) and interfaces necessary for executing the requested codec program.

If these further checks pass, the codec server 3A authorizes the download (step 102), and the requested codec program is downloaded from the codec server 3A to the IP softphone apparatus 2A (step 103).

If authentication is unsuccessful because the IP softphone apparatus 2A has inadequate capabilities or lacks a necessary interface, then as noted above, the codec server 3A may select a suitable wrapper from a plurality of stored wrappers, and download the codec program and wrapper together to enable the IP softphone apparatus 2A to execute the requested codec program.

The CPU 11 in the IP softphone apparatus 2A incorporates the downloaded codec program into the voice program 31, assigns the downloaded codec program the highest priority, and lowers the priority of other existing codec programs by one level (step 104). Accordingly, when negotiating to set up a call with another IP softphone apparatus, the IP softphone apparatus 2A uses the downloaded codec program as its first choice in the negotiation.

Alternatively, the user may be allowed to set the priority of the downloaded codec programs.

When adding the downloaded codec program to its list of stored codec programs, the softphone program 21P may automatically delete another codec program (the codec program with the lowest priority, for example) so that the total number of stored codec programs remains constant. Alternatively, the downloaded codec program may simply be added to the list of stored codec programs, without deleting another codec program.

The downloading of a codec program may also be initiated by the codec server 3A itself. For example, a system administrator or maintenance operator in IP telephone system 5A who has installed a new codec program in the codec server 3A may specify conditions under which subscribers qualify to receive the new codec program and schedule a multicast to the qualified subscribers at a fixed time (e.g., midnight). At the scheduled time, the CPU 41 in the codec server 3A refers to the contract details in the subscriber information 51 to recognize the qualifying subscribers, and sends them the codec program by a multicast. The IP softphone apparatuses receiving the multicast store the codec program by a process similar to that described above.

Figure 6:
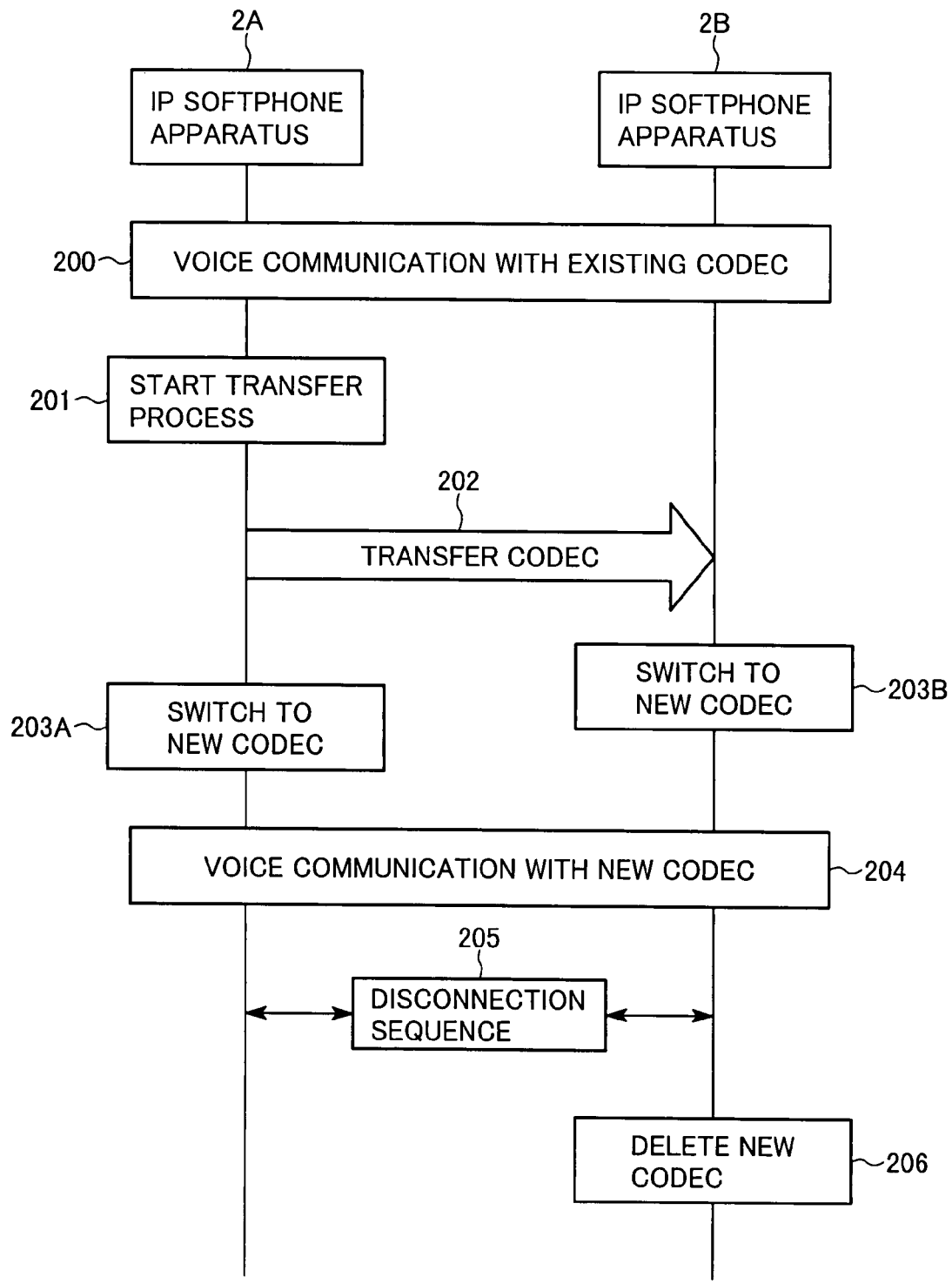
FIG. 6 illustrates a communication sequence for transferring a codec program the two telephone terminals in FIG. 1.

Next, the operation by which IP softphone apparatus 2A transfers a codec program downloaded from the codec server 3A (or initially provided in the softphone program 21P) to IP softphone apparatus 2B will be described with reference to the sequence diagram in FIG. 6. This program transfer is executed by HTTP or RTCP (APP). In the following description, an 'A' will be added to the reference characters of component elements of IP softphone apparatus 2A, and a 'B' to the reference characters of component elements of IP softphone apparatus 2B.

This codec program transfer takes place during a voice call between IP softphone apparatuses 2A and 2B. Regardless of which IP softphone apparatus originates the call, before voice communication begins, a negotiation is carried out in which the two IP softphone apparatuses 2A, 2B select a codec program possessed by both of them. A voice communication session then begins, using this common codec program (step 200). If the two IP softphone apparatuses 2A and 2B have a plurality of codec programs in common, they negotiate to select the common codec program with the highest priority.

If one of the IP softphone apparatuses has a codec program not possessed by the partner IP softphone apparatus, and this codec program has a higher priority than the selected common codec program, then the higher-priority codec program may be transferred to the other IP softphone apparatus while voice communication is in progress, after which the two IP softphone apparatuses may switch over to the transferred codec program.

Suppose, for example, that IP softphone apparatus 2A has a codec program with a higher priority than the selected common codec program. Once voice communication has begun, its CPU 11A executes the terminal transmitting program section 322A in the codec transfer program 32A and displays the identifying information of the higher-priority codec program on the display unit 20A, together with a prompt inviting the user to switch over. If IP softphone apparatus 2A has two or more higher-priority codec programs, one of them (the highest-priority one, for example) may be selected and displayed, or a list may be displayed from which the user can choose.

If the user responds positively to the invitation, IP softphone apparatus 2A initiates a transfer of the selected higher-priority codec program to IP softphone apparatus 2B (step 201). The transfer proceeds (step 202) on a channel different from the channel carrying the voice communication session. The call control channel may be used, for example, or a new channel may be set up for the transfer. The CPU 11B in IP softphone apparatus 2B incorporates the received codec program into its voice program 31B and adjusts the priority order of its codec programs.

The codec program is transferred together with information, set by IP softphone apparatus 2A, specifying a time at which to switch over from the common codec program currently in use to the transferred codec program, and specifying a deletion condition such as an expiration time for the transferred codec program.

At the specified switchover time, the CPU 11A in IP softphone apparatus 2A and the CPU 11B in IP softphone apparatus 2B simultaneously switch from the common codec program selected at the beginning of the call to the higher-priority codec program which is now stored in both IP softphone apparatuses (steps 203A and 203B). A smooth transition is thus made to a new coding and decoding method that provides higher performance, e.g., better voice quality. Voice communication continues without interruption, now using the higher-quality codec program (step 204).

When the user of either IP softphone apparatus 2A or 2B goes on-hook, a call disconnection sequence is executed, and the voice communication session is terminated (step 205).

After the call has been disconnected, the CPU 11B in the IP softphone apparatus 2B to which the new codec program was transferred deletes the transferred codec program by executing the terminal receiving program section 323B of its codec transfer program 32B according to the deletion condition received with the transferred codec program (step 206). The deletion condition may, for example, specify an expiration time of five minutes from disconnection of the call. If no further call is made between IP softphone apparatuses 2A and 2B within this time, the transferred codec program is deleted from the voice program 31B of IP softphone apparatus 2B. If another call between IP softphone apparatuses 2A and 2B is set up within the expiration time, however, the transferred higher-quality codec program is selected in the negotiation process and used during the call without having to be transferred again.

The deletion condition is not limited to an expiration time. For example, the transferred codec program may be deleted from IP softphone apparatus 2B if it is not used in the next N calls originated or received by IP softphone apparatus 2B, where N is a specified positive integer.

When a codec program is transferred between two IP softphone apparatuses in the same IP telephone system, the deletion condition may be omitted; the IP softphone apparatus that receives the codec may be allowed to keep the codec program as if it had downloaded the codec program itself. Alternatively, the IP softphone apparatus that receives the codec program may inform the codec server in the system and seek instructions as to whether or not the codec program should be deleted according to the expiration condition. The codec server responds according to the details of the subscriber's contract.

In the above embodiment, when IP softphone apparatuses are equipped with the same softphone program 21P, even if they belong to different IP telephone systems, voice communication between them is not restricted to use of a codec program that they both already possess; they can switch over to the best codec program that either IP softphone apparatus can provide. For example, if their only common codec program is a narrowband program but one of the two IP softphone apparatuses also has a broadband codec program, the broadband codec program can be transferred to the partner IP softphone apparatus during a call, and after the transfer, the call can proceed by use of the broadband codec program, with a marked improvement in call quality.

In a variation of the preceding embodiment, the codec program transfer from IP softphone apparatus 2A to IP softphone apparatus 2B is initiated automatically by IP softphone apparatus 2A, without requiring any operation by the user. The transfer may then be arranged during the negotiation to set up the call, and may begin during the negotiation or immediately after the call is set up. This scheme has the advantage of not distracting the user during the call.

In another variation, the codec program transfer is completed during the negotiation process. This scheme has the advantage of enabling the entire call to by made with the higher-quality codec program, but the disadvantage that the user who originates the call may have to wait for some time before voice communication can begin. In general, it is preferable to switch codec programs during the call, as described above.

The invention is not restricted to any specific types of codec programs. Standard codec programs such as codec programs complying with recommendations drafted by the Telecommunications Sector of the International Telecommunication Union (ITU-T) may be transferred, as may proprietary codec programs or other codec programs using either standard or nonstandard coding and decoding methods.

The invention is not restricted to any particular type of telephone terminal. The telephone terminals may be IP softphone apparatuses as described above, or any other type of telephone terminal capable of transferring and using a plurality of codec programs. The telephone terminals may be fixed or mobile.

The memory configuration of the codec servers and telephone terminals is not limited to the ROM, RAM, and hard disk configuration shown in FIGS. 2 and 4.

Those skilled in the art will recognize that further variations are possible within the scope of the invention, which is defined in the appended claims.

What is claimed is:

1. A telephone terminal, comprising:
   a memory for storing a plurality of codec programs with respective priorities, each of the codec programs being executed to code and decode voice signals;
   a codec selection processor operative to negotiate with a partner telephone terminal to use a common codec program from the codec programs, the common codec program being stored at both the telephone terminal and the partner telephone terminal;
   a voice processor operative to execute the common codec program to code and decode voice signals during voice communication with the partner telephone terminal; and
   a transmitting processor operative to transfer a particular codec program stored in the memory to the partner telephone terminal over a communication network, wherein
   the codec selection processor selects a codec program, which is not stored at the partner telephone terminal and has a higher priority than a priority of the common codec program, from the plurality of codec programs stored in the memory, during the voice communication in which the voice signals are coded and decoded by executing the common codec program,
   the transmitting processor transfers the selected codec program to the partner telephone terminal during the voice communication in which the voice signals are coded and decoded by executing the common codec program, the transmitting processor transferring the selected codec program together with a deletion condition instructing the partner telephone terminal to delete the selected codec program after the voice communication is completed, and the deletion condition instructs the partner telephone terminal to delete the selected codec program after a designated number of voice communication sessions have been completed without using the selected codec program, and
   the voice processor switches from executing the common codec program to executing the selected codec program during the voice communication in which the voice signals are coded and decoded by executing the common codec program.

2. The telephone terminal of claim 1, wherein the telephone terminal and the partner telephone terminal are terminals of different telephone communication systems.

3. The telephone terminal of claim 1, wherein the telephone terminal is an Internet protocol softphone.

4. The telephone terminal of claim 1, wherein the selected codec program provides higher voice quality than the common codec program.

5. The telephone terminal of claim 1, wherein the transmitting processor begins transferring the selected codec program automatically in response to a command from the codec selection processor.

6. The telephone terminal of claim 1, further comprising an operation unit for receiving commands from a human user,
wherein the transmitting processor begins transferring the selected codec program in response to a command from the human user.

7. The telephone terminal of claim 1, wherein the deletion condition instructs the partner telephone terminal to delete the selected codec program after elapse of a designated time from completion of the voice communication unless voice communication between the telephone terminal and the partner telephone terminal resumes within the designated time.

8. The telephone terminal of claim 1, further comprising a downloading processor operative to download a codec program from a codec server connected to the communication network and store the downloaded codec program in the memory.

9. A telephone communication system comprising a plurality of telephone terminals as recited in claim 1, wherein codec programs are transferred between the telephone terminals.

10. The telephone communication system of claim 9, further comprising a codec server for transferring a transferred codec program to the telephone terminals.

11. The telephone communication system of claim 10, wherein the codec server also transfers a wrapper to adapt the transferred codec program to the telephone terminals causing the telephone terminals to execute the transferred codec program.

12. The telephone terminal of claim 1, further comprising a receiving processor operative to receive a codec program that is not stored at the telephone terminal from the partner telephone terminal through the communication network during the voice communication and store the received codec program in the memory during the voice communications, wherein
the voice processor switches from executing the common codec program to executing the received codec program during the voice communication.

13. The telephone terminal of claim 12, wherein the receiving processor assigns a priority, that is higher than any other of the priorities, to the received codec program.

14. The telephone terminal of claim 12, further comprising a downloading processor operative to download a codec program from a codec server connected to the communication network and store the downloaded codec program in the memory, wherein
the receiving processor assigns a priority, that is higher than any other of the priorities, to the downloaded codec program.

15. The telephone terminal of claim 1, wherein the transmitter processor transfers the selected codec program while voice IP packets are being transferred between said telephone terminal and said partner telephone terminal.

16. A non-transitory machine-readable media storing a program executable by a computer having a memory to configure the computer to operate as a telephone terminal, the program including instructions that execute the following steps:
negotiating with a partner telephone terminal to use a common codec program, the common codec program being stored at both the telephone terminal and the partner telephone terminal;
executing the common codec program to code and decode voice signals during voice communication with the partner telephone terminal;
selecting a codec program, which is not stored at the partner telephone terminal and has a higher priority than a priority of the common codec program, from a plurality of codec programs with respective priorities stored in the memory, during the voice communication in which the voice signals are coded and decoded by executing the common codec program;
transmitting over a communication network the selected codec program from the telephone terminal to the partner telephone terminal during the voice communication in which the voice signals are coded and decoded by executing the common codec program, the transmitting including transferring the selected codec program together with a deletion condition instructing the partner telephone terminal to delete the selected codec program after the voice communication is completed, and the deletion condition instructs the partner telephone terminal to delete the selected codec program after a designated number of voice communication sessions have been completed without using the selected codec program; and
switching from executing the common codec program to executing the selected codec program during the voice communication in which the voice signals are coded and decoded by executing the common codec program.

17. The media of claim 16, wherein the transmitting the selected codec program occurs while voice IP packets are being transferred between said telephone terminal and said partner telephone terminal.

* * * * *